United States Patent
Swanson

[15] 3,675,442
[45] July 11, 1972

[54] ATMOSPHERIC WATER COLLECTOR

[72] Inventor: Rollin J. Swanson, 6337 N. 22nd Street, Arlington, Va. 22205

[22] Filed: Feb. 12, 1971

[21] Appl. No.: 114,763

[52] U.S. Cl. ............................62/285, 62/93, 62/272, 62/291
[51] Int. Cl. ......................................................F25d 21/14
[58] Field of Search ...........................62/291, 93, 272, 285

[56] References Cited

UNITED STATES PATENTS

| | | |
|---|---|---|
| 2,409,624 | 10/1946 | Granville ................................62/291 |
| 2,499,982 | 3/1950 | Suiter ........................................62/93 |
| 2,761,292 | 9/1956 | Coandu ...................................62/291 |
| 2,996,897 | 8/1961 | Grimes ....................................62/293 |
| 3,498,077 | 3/1970 | Gerard ....................................62/291 |

*Primary Examiner*—William J. Wye
*Attorney*—Finnegan, Henderson & Farabow

[57] ABSTRACT

Apparatus including a fresh water cooling bath is provided for obtaining potable water from moisture-laden air. Mechanical refrigeration means intermittently cool the fresh water bath. Conduit means permit the fresh water in the bath to flow to and from a specially designed housing that chanels a flow of moisture-laden air. Vertically aligned condenser filaments are positioned within the housing and connected to the conduit means to provide condensing surfaces at a temperature below the dew point of the air in the housing. Distributing means are provided for either directing the condensed water, depending on its temperature, to the bath, or for directing the condensed water from the apparatus as output water.

6 Claims, 4 Drawing Figures

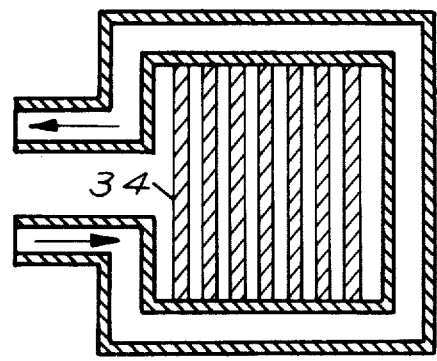
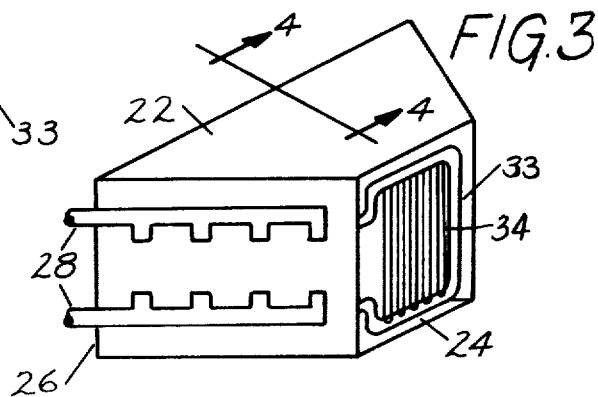
FIG. 1  FIG. 3
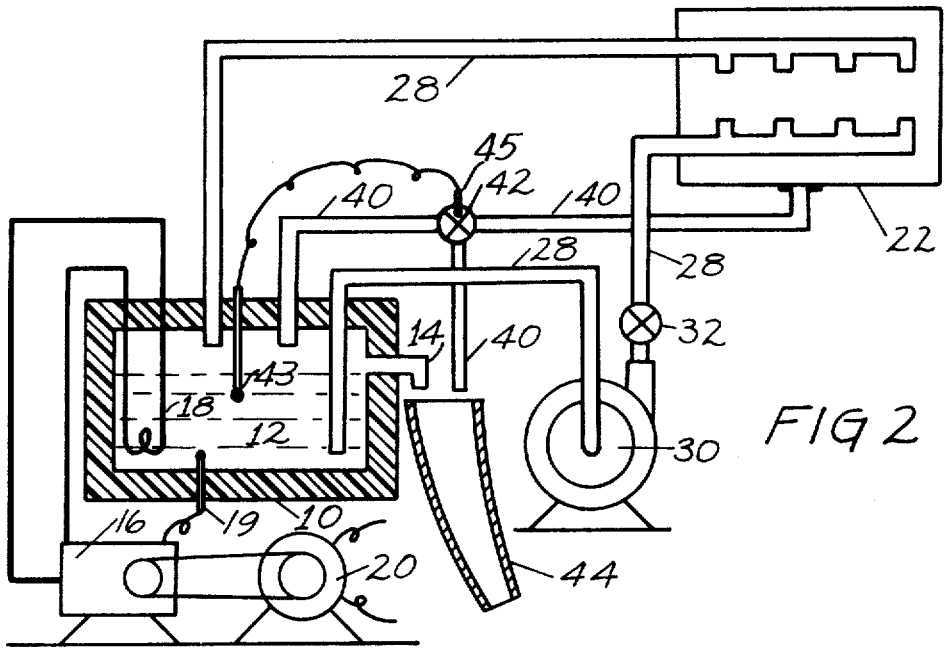
FIG 2
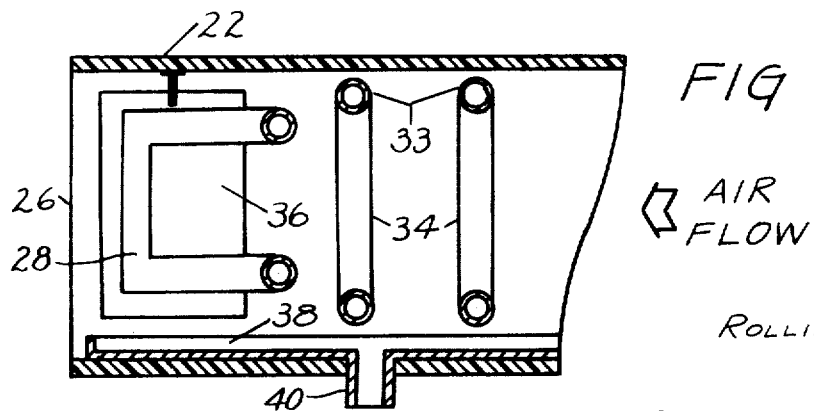
FIG 4
INVENTOR
ROLLIN J. SWANSON
BY FINNEGAN, HENDERSON & FARABOW
ATTORNEYS

ATMOSPHERIC WATER COLLECTOR

This invention relates to apparatus for separating a more condensible fraction of a gas from a less condensible fraction and more particularly for effectively condensing water vapor from a humid atmosphere. While the invention will be particularly described as an apparatus for recovering potable water from humid air, it also performs a dehumidifying function.

There are large areas of the world in which fresh water is in critical demand. Many different methods are being utilized to recover fresh water from salt or brackish water. These methods necessarily produce a salt brine or solid residue of salts which may provide a waste disposal problem.

Many areas of the world which suffer from a deficiency of fresh water actually have a huge volume of fresh water potentially available in the form of atmospheric moisture. While it has previously been proposed to condense the atmospheric moisture to obtain potable water, prior to the present invention no economically feasible condensation method or apparatus was available.

In the past, water vapor has been removed from humid air primarily for the purpose of lowering humidity. This humidity lowering has been accomplished chemically and mechanically. When done chemically, using chemicals to absorb water from the atmosphere, the water is then not readily available for further usage as potable water. In the usual mechanical dehumidifying processes, as conducted in commercial dehumidifier units, the atmosphere is passed over cooling coils through which a refrigerant is passed. Only a small fraction of the water vapor present in the air that is exposed to the cooling coils is actually condensed. The condensed water in this case is potable.

Mechanical dehumidifiers are generally inefficient, because space requirements dictate that they shall be small, compact, and often portable units. Consequently, while they may process a large volume of air, they are relatively inefficient in converting moist air to potable water.

This invention provides a very efficient apparatus for removing water vapor from the air. The apparatus comprises a container holding a bath of fresh water and mechanical refrigeration means for controlling the temperature of the bath. A housing including an inlet opening and an outlet opening is provided for channeling a flow of moisture-laden air. The outlet opening of the housing has a larger cross-sectional area than the inlet opening of the housing. Conduit means are provided having an inlet opening in the container and extending through the housing and discharging into the bath. The conduit means includes a pump for circulating water through the conduit means. A plurality of closely spaced solid condenser filaments are positioned within the housing and connected to the conduit means in a manner that provides good conductive heat transfer between the filaments and the conduit means. The filaments provide condensing surfaces at a temperature below the dew point of the air in the housing. Collection means receive water condensed onto said filaments and distributing means direct the collected condensed water to the bath if the temperature of the condensed water is below a predetermined level and direct the condensed water from the apparatus as output water if the temperature of the condensed water is above the predetermined level.

The condensing apparatus of the invention includes a multiplicity of solid filaments attached to a conduit through which a refrigerant flows. These filaments are cooled mainly by conduction by the conduit means.

The invention itself will best be understood from the following detailed description of a preferred embodiment.

Of the Drawings

FIG. 1 is an enlarged sectional view of one embodiment of a condensing frame;

FIG. 2 is a schematic view, partly in section, of a collection apparatus constructed in accordance with the invention;

FIG. 3 is a perspective view of the housing illustrated in FIG. 2;

FIG. 4 is an enlarged vertical section taken along line 4—4 of FIG. 3.

With reference to FIG. 2, there is shown a thermally insulated closed container 10 holding a bath 12 of fresh water. The level of bath 12 is held below a prescribed level by means of an overflow pipe 14. A means for lowering the temperature of bath 12 is provided by a mechanical refrigeration device 16 including a cooling coil portion 18 immersed in fresh water bath 12. A thermostat 19 maintains the water bath at the desired temperature by controlling the duration of time the refrigeration unit 16 is driven by its power source 20.

A housing 22 is provided to channel a flow of moisture laden air and, as illustrated in FIG. 3, has an inlet opening 24 through which the air flow enters that is of lesser cross sectional area than the outlet opening 26 through which the air flow exits.

Housing 22 is designed to house a multiplicity of condensing frames with attached filaments and plates. The housing is specifically designed in the form of an expansion housing where the input area is less than the output area. This is of importance in that if allows a given input volume of air entering at some velocity to have that velocity decreased thereby allowing the air more exposure time to the condensing surfaces.

In accordance with the invention, a conduit means 28 is provided that has its inlet opening below the surface of water bath 12 and extends through housing 22 and eventually discharges into bath 12. Conduit means 28 includes a pump 30 for circulating water therethrough and a valve 32 for controlling the flow rate of the circulating cooling water. A plurality of condensing frames 33 form part of the conduit means and are positioned within housing 22 in a longitudinally spaced relationship.

As best illustrated in FIGS. 1 and 3, condensing frames 33 are each U-shaped and each define a planar loop which starts at one side wall of housing 22 and returns to the same side wall with the plane of the loop extending transversely across the flow path of the air. The outer periphery of each frame 33 has about the same configuration as the inside periphery of the adjacent portion of housing 22 and is closely spaced therefrom so that air passing along the walls of the housing is cooled by frames 33. Vertically aligned filaments 34 extend between the spaced legs of the U-shaped frames to provide a good downward flow path for condensing droplets. Each end of each filament 34 is connected to frame 33 in efficient conductive heat transfer contact to help insure that the entire filament remains at a temperature level low enough to insure condensation. The filaments 34 are closely spaced to insure intimate contact between the moisture in the air and the condensing surfaces of the filaments.

A plurality of solid plates 36 are connected to the conduit means 28 at the exit face 26 of the housing 22. Filaments 34 are placed in intimate contact with condensing frame 33 as illustrated in FIG. 4, to insure that the members are in good conductive contact for efficient heat transfer therebetween. The filaments and plates provide condensing surfaces at temperatures below the dew point of the air in housing 22. Additionally, the plates 36 control the direction of air leaving the housing. The vertical alignment of the filaments helps provide efficient condensation and drainage of product liquid.

A collection means 38 best illustrated in FIG. 4 receives the water condensed on the filaments 34 and plates 36. As here embodied, the collection means is as a shallow vessel located under the filaments and plates to collect the condensed water as it is permitted to drain and drop off by gravity. Condensed water is drained from collection means 38 into distributing means 40, with the condensed water directed to the fresh water bath 12 if the temperature of the condensed water is not more than a predetermined desired temperature.

If the temperature of the condensed water is above the predetermined temperature, the condensed water is directed away from the apparatus to a discharge means 44. A temperature sensing valve 42 determines which path the condensed water should follow. Valve 42 includes a sensor 45 that is capable of sensing the condensed water temperature, and a sensor 43 senses the fresh water bath temperature. If the condensed water is directed away from bath 12 by valve 42 or if water from the fresh water bath 12 overflows through overflow pipe 14, discharge means 44 delivers output water from the apparatus.

In operation, the power source 20, receiving its energy from electricity which may be commercially available or produced by windmill operation, for example, operates the mechanical refrigeration unit 16 which in turn cools the fresh water bath to some temperature considerably below the dew point temperature of the ambient air. This cooled fresh water is then pumped through the conduit means 28. Attached to the conduit means and condensing frame 33 are filaments 34 and plates 36 which by thermal conduction are themselves cooled well below the dew point of the ambient air. Ambient air is passed, preferably at very low flow rates which can usually be supplied by local wind velocities, over the filaments and plates. When the ambient air is cooled below its dew point, fresh water condenses on the filaments and plates. This condensed water drains by gravity off the condensing surfaces and into the collector 38. The temperature of the condensed water is compared to the fresh water bath temperature by the temperature sensing valve 42 in conjunction with the bath temperature sensor 43 and the condensed water is directed to the fresh water bath if the condensed water temperature is below some predetermined temperature.

The above-described predetermined temperature is determined as follows. The mechanical refrigeration unit cools the fresh water bath to a low temperature and then can be turned off. The pump 30 continues to circulate the water from the fresh water bath through the conduit means. As water is condensed out of the ambient air, the circulated water gradually warms up because (1) it is absorbing heat from the ambient air and (2) the condensed water, which is slightly warmer than the bath, is being mixed with the bath. At some predetermined temperature, designated T, which is dependent on the specific conditions of the ambient air, the circulated bath water no longer effectively causes condensation from the ambient air and the mechanical refrigeration unit must again be turned on. This temperature T can readily be determined by ascertaining the temperature and relative humidity of the ambient air and then referring to a psychrometric chart.

Condensing frames 33, the sections of the conduit means to which filaments 34 are attached, are constructed of a good heat conducting material such as copper. The filaments are constructed of a solid conducting material such as copper and are closely spaced across each of the frames. These filaments are themselves cooled by conduction resulting from intimate contact with the condensing frame. The structural arrangement of the frames and filaments allows the total volume of the housing 22 to be efficiently filled with cooled condensing surfaces.

The final stage of cooling in housing 22 is provided by the plates 36 made of a good heat conducting material such as copper. Plates 36 are attached to and cooled by the conduit means 28. These plates accomplish the dual purpose of exposing the ambient air flowing through the system to one final condensing surface as well as controlling the exit direction of the now cooled and dried air.

Since the primary function of the apparatus of the invention is to remove a useful amount of fresh water from a humid ambient air supply, it must be noted that a substantial amount of heat exchange surface must be provided by the filaments 34 and the plates 36. A relatively high co-efficient of heat transfer may be obtained on the surface of the filaments and plates by promoting dropwise condensation thereon, such as by plating these surfaces with noble metals as disclosed in U.S. Pat. No. 3,289,753.

The condensed pure, fresh water is eventually directed to the discharge means as product water. No undesirable pollutants are created from the entire operation.

While this invention has been described with reference to removing water vapor from humid air, it is to be understood that the mechanical design of the apparatus will allow the separation of any more condensible fraction of a gas from a less condensible fraction.

The described apparatus will effectively, using only a small installation, remove sufficient moisture from humid air to satisfy the demands for fresh water of a small group of people or animals. However, the apparatus described can be scaled up for large scale commercial operations with no inherent degradation in function or performance.

This invention is not limited to the described preferred embodiment thereof. Modifications will be obvious to those skilled in the art.

What is claimed is:

1. Apparatus for collecting water from a flow of moisture-laden air comprising:
   a. a container holding a bath of fresh water;
   b. mechanical refrigeration means for controlling the temperature of said bath;
   c. a housing having an inlet opening and an outlet for channeling the flow of moisture-laden air, said outlet opening exceeding the cross-sectional area of said inlet opening;
   d. conduit means having an inlet opening in said container, said conduit means extending through said housing and discharging into said bath, said conduit means including a pump for circulating water therethrough;
   e. a plurality of closely spaced solid condenser filaments positioned within the housing and connected to said conduit means to provide good conductive heat transfer, between said filaments and said conduit means, said filaments providing condensing surfaces at temperatures below the dew point of the air in the housing;
   f. collection means for receiving water condensed into said filaments; and
   g. distributing means for directing the condensed water to said bath if the temperature of the condensed water is not more than a predetermined temperature; and for directing the condensed water from the apparatus as output water if the temperature of the condensed water is above the predetermined temperature.

2. The apparatus of claim 1 including discharge means connected with said bath for delivering output water from the apparatus when the level of said bath exceeds a desired level.

3. The apparatus of claim 1 including a plurality of cooling plates located at the exit end of said housing and connected to said conduit means to provide good conductive heat transfer between said plates and said conduit means.

4. The apparatus of claim 1 in which said conduit means includes a plurality of longitudinally spaced, U-shaped condensing frames positioned within said housing and extending traversely across said housing, and each of said filaments extends between the spaced leg portions of a condensing frame.

5. The apparatus of claim 4 in which each of said U-shaped condensing frames has an outer periphery similar in configuration to the inside periphery of the adjacent portion of said housing, and is closely spaced therefrom.

6. The apparatus of claim 5 in which said filaments extend vertically to promote efficient condensation and drainage.

* * * * *

UNITED STATES PATENT OFFICE
CERTIFICATE OF CORRECTION

Patent No. 3,675,442        Dated July 11, 1972

Inventor(s) ROLLIN J. SWANSON

It is certified that error appears in the above-identified patent and that said Letters Patent are hereby corrected as shown below:

Claim 1, column 4, line 39, change "into" to --unto--.

Claim 4, column 4, line 57, change "traversely" to --transversely--.

Signed and sealed this 17th day of October 1972.

(SEAL)
Attest:

EDWARD M. FLETCHER, JR.
Attesting Officer

ROBERT GOTTSCHALK
Commissioner of Patents